United States Patent [19]

Schweier et al.

[11] 4,113,933

[45] Sep. 12, 1978

[54] MANUFACTURE OF HOMOPOLYMERS AND COPOLYMERS OF α-MONOOLEFINS

[75] Inventors: Günther Schweier, Ludwigshafen; Erich Kolk, Bad Durkheim; Heinz Mueller-Tamm, Ludwigshafen; Hans Frielingsdorf, Bad Durkheim; Robert Bachl, Worms; Wolfgang Gruber, Frankenthal, all of Fed. Rep. of Germany

[73] Assignee: BASF Aktiengesellschaft, Ludwigshafen, Fed. Rep. of Germany

[21] Appl. No.: 762,858

[22] Filed: Jan. 27, 1977

[30] Foreign Application Priority Data

Feb. 3, 1976 [DE] Fed. Rep. of Germany ....... 2603919

[51] Int. Cl.$^2$ .......................... C08F 4/02; C08F 10/02
[52] U.S. Cl. ................................ 526/124; 252/429 C; 526/119; 526/125; 526/352
[58] Field of Search ........................ 526/124, 125, 119

[56] References Cited

U.S. PATENT DOCUMENTS

| 3,718,635 | 2/1973 | Tomoshige et al. | 526/125 |
|---|---|---|---|
| 3,787,384 | 1/1974 | Stevens et al. | 526/125 |
| 3,941,760 | 3/1976 | Herbeck et al. | 526/124 |
| 3,956,255 | 5/1976 | Ort | 526/129 |
| 3,993,588 | 11/1976 | Thukral | 526/124 |

FOREIGN PATENT DOCUMENTS

| 2,352,154 | 6/1974 | Fed. Rep. of Germany. |
|---|---|---|
| 4,718,846 | 5/1972 | Japan. |
| 1,264,416 | 2/1972 | United Kingdom. |
| 1,352,718 | 5/1974 | United Kingdom. |
| 1,381,605 | 1/1975 | United Kingdom. |

*Primary Examiner*—Edward J. Smith
*Attorney, Agent, or Firm*—Keil, Thompson & Shurtleff

[57] ABSTRACT

A process for the manufacture of homopolymers and copolymers of α-monoolefins of 2 to 6 carbon atoms by polymerizing the monomer or monomers by means of a Ziegler catalyst system comprising (1) a catalyst component containing titanium and (2) a particular compound of aluminum, magnesium or zinc, the atomic ratio of titanium from catalyst component (1) to metal (Me) from catalyst component (2) being from 1 : 0.1 to 1 : 500, wherein the titanium-containing catalyst component (1) employed is the solid-phase product (VI) obtained by (1.1) first bringing into contact (1.1.1) a particular finely divided, porous, inorganic oxidic material (I) and (1.1.2) a particular aluminum compound (II) dissolved in an organic solvent, to form a solid-phase product (III) and (1.2) then bringing into contact (1.2.1) the solid-phase product (III) obtained from stage (1.1) and (1.2.2) a solution (IV) which is obtained on bringing together (IVa) 100 parts by weight of a particular alcohol, (IVb) from 0.01 to 6 parts by weight (calculated as titanium) of a titanium trihalide and (IVc) from 0.01 to 4 parts by weight (calculated as magnesium) of a magnesium compound which is soluble in the alcohol (IVa), to form a dispersion (V), and evaporating the dispersion (V) until it has a dry consistency, thus forming the solid-phase product (VI). The new process is particularly advantageous for the manufacture of homopolymers and copolymers having, for example, particularly advantageous morphological properties.

18 Claims, No Drawings

MANUFACTURE OF HOMOPOLYMERS AND COPOLYMERS OF α-MONOOLEFINS

The present invention relates to a process for the manufacture of homopolymers and copolymers of α-monoolefins of 2 to 6 carbon atoms by polymerizing the monomer or monomers at from 30° to 200° C and pressures of from 0.1 to 200 bars, using a Ziegler catalyst system comprising
(1) a titanium-containing catalyst component and
(2) a metal compound of the general formula $$Me\ A_{m-n} X_n$$

where Me is aluminum, magnesium or zinc, preferably aluminum, A is a hydrocarbon radical of 1 to 12 carbon atoms, in particular alkyl of 1 to 12 carbon atoms, and preferably alkyl of 2 to 8 carbon atoms, X is chlorine, bromine, iodine or hydrogen, preferably chlorine or hydrogen, m is the valency of the metal M and n is a number from 0 to $m-1$, preferably from 0 to 1, with the proviso that the atomic ratio of titanium from catalyst component (1) to metal (Me) from catalyst component (2) is from 1 : 0.1 to 1: 500, preferably from 1 : 0.2 to 1 : 200.

Processes of this type have proved valuable in industrial operation, but still leave scope for a number of minor or major improvements. Thus, for example, the titanium-containing catalyst component (1) to be employed is in many cases unsatisfactory. This is true also of those titanium-containing catalyst components manufactured by starting from a finely divided carrier. It is known that these supported catalysts are in general to be preferred, in industrial operation, to other titanium-containing catalyst components, since they permit smooth operation and give good results. However, this advantage is offset by the disadvantage that the conventional supported catalysts of the type in question here present some hazards in handling and/or are expensive to manufacture, and cause a relatively high degree of pollution of the environment.

It is an object of the present invention to provide titanium-containing catalyst components (1) which are manufactured starting from a finely divided carrier but do not suffer from the above disadvantages, or do so to a substantially lesser degree, and furthermore prove advantageous in operation and in the result of the process, for example which are able to give a polymer which has particularly advantageous morphological properties.

We have found that this object is achieved by means of a titanium-containing catalyst component (1) which is obtained by first bringing a particular finely divided silicon oxide carrier into contact with a solution of a particular aluminum compound, then bringing the resulting solid-phase product into contact with a particular solution which is obtained from a particular alcohol, a titanium trihalide and a magnesium compound, and finally isolating a solid phase from the resulting dispersion by evaporation.

Accordingly, the present invention relates to a process for the manufacture of homopolymers and copolymers of α-monoolefins of 2 to 6 carbon atoms by polymerizing the monomer of monomers at from 30° to 200° C and pressures of from 0.1 to 200 bars by means of a Ziegler catalyst system comprising
(1) a titanium-containing catalyst component and
(2) a metal compound of the general formula $$Me\ A_{m-n} X_n$$

where Me is aluminum, magnesium or zinc, preferably aluminum, A is a hydrocarbon radical of 1 to 12 carbon atoms, in particular alkyl of 1 to 12 carbon atoms, and preferably alkyl of 2 to 8 carbon atoms, X is chlorine, bromine, iodine or hydrogen, preferably chlorine or hydrogen, m is the valency of the metal Me and n is a number from 0 to $m-1$, preferably from 0 to 1, with the proviso that the atomic ratio of titanium from catalyst component (1) to metal (Me) from catalyst component (2) is from 1 : 0.1 to 1 : 500, preferably from 1 : 0.2 to 1 : 200. In this process, the titanium-containing catalyst component (1) employed is the solid-phase product (VI) obtained by first
(1.1) bringing into contact
(1.1.1) a finely divided, porous, inorganic oxidic material (I) which has a particle diameter of from 1 to 1,000μm, preferably from 1 to 400μm, a pore volume of from 0.3 to 3, preferably from 1 to 2.5, cm³/g and a surface area of from 100 to 1,000, preferably from 200 to 400 m²/g, and which has the formula $SiO_2.aAl_2O_3$, where a is a number from 0 to 2, especially from 0 to 0.5, and
(1.1.2) an aluminum compound (II), dissolved in an organic solvent, the compound having the general formula $$Al\ B_{3-p} Y_p$$

where B is a hydrocarbon radical of 1 to 12 carbon atoms, especially alkyl of 1 to 12 carbon atoms, and preferably alkyl of 1 to 8 carbon atoms, Y is chlorine, bromine, iodine, hydrogen or OR, preferably chlorine, hydrogen or OR, R is a hydrocarbon radical of 1 to 12 carbon atoms, especially alkyl of 1 to 12 carbon atoms, and preferably alkyl of 1 to 8 carbon atoms and p is a number from 0 to 3, preferably from 0 to 2, to form a solid-phase product (III), with the proviso that the weight ratio of inorganic oxidic material (I) employed to aluminum compound (II) employed is from 1 : 0.05 to 1 : 10, preferably from 1 : 0.2 to 3, and then
(1.2) bringing into contact
(1.2.1) the solid-phase product (III) obtained from stage (1.1) and
(1.2.2) a solution (IV) obtained by bringing together
(IVa) 100 parts by weight of an alcohol of the general formula $$Z-OH$$

where Z is a saturated hydrocarbon radical of 1 to 8 carbon atoms, especially a saturated hydrocarbon radical of 1 to 6 carbon atoms, and preferably alkyl of 1 to 4 carbon atoms,
(IVb) from 0.01 to 6, preferably from 0.04 to 3.5, parts by weight (calculated as titanium) of a titanium trihalide, where the halogen may be chlorine and/or bromine, preferably a titanium trichloride, and
(IVc) from 0.01 to 4, preferably from 0.04 to 2.5, parts by weight (calculated as magnesium) of a magnesium compound which is soluble in the alcohol (IVa), especially of a compound which contains halogen and/or carbon, and preferably a compound which contains chlorine and carbon, to form a dispersion (V), with the proviso that the weight ratio of solid-phase product (III — calculated as inorganic oxidic material I) — to titanium in the titanium trihalide (IVb) is from 1 : 0.01 to 1 : 0.2, preferably from 1 : 0.03 to 1 : 0.15, and the weight ratio of solid-phase product (III — calculated as inorganic oxidic material I) — to magnesium in the magnesium compound (IVc) is from 1 : 0.01 to 1 : 0.25, preferably from 1 : 0.03 to 1 : 0.15, and evaporating the dispersion (V) at below 200° C, preferably below 160° C, and above the melting point of the alcohol (IVa) used, until it reaches a dry consistency, i.e. until the solid-phase product (VI) is formed.

In relation to comparable conventional processes, the process according to the invention is distinguished by the fact that, for example, it provides technical and economic improvements. Thus, manufacture of the catalyst is simplified because it can be carried out in only two stages; since, furthermore, it is not necessary to use an excess of the titanium compound, in contrast to conventional processes, there is also a significant improvement in respect of economy and reduced pollution of the environment.

Furthermore, a substantial advantage achievable by polymerizing olefins by means of the new catalysts is that the latter can be obtained in forms which have a relatively high productivity (expressed as amount by weight of polymer per unit weight of titanium) and a relatively low halogen content. The inherently undesirable catalyst constituents in the polymer (titanium and halogen) are then present in such low amounts that they no longer interfere and that their removal — which would require a separate process step — is unnecessary. The polymers obtainable by the process of the invention furthermore exhibit other advantageous properties; for example, their morphology conforms to an important range of requirements, namely that the content of pulverulent polymer particles is very low, thereby greatly reducing the hazard of dust explosions, and the shape of the particles is such that not only can the material be stirred easily (an important aspect when manufacturing the polymer), but it also has a high tap density and good free-flowing characteristics, both being advantageous from the point of view of handling the polymers.

The following points of detail of the process of the invention may be noted:

The polymerization process as such can — taking into account the characteristic features thereof — be carried out in virtually all the relevant conventional technological embodiments, i.e. as a batchwise, cyclic or continuous process, which processes may be, for example, a suspension polymerization, solution polymerization or dry-phase polymerization. The said technological embodiments, i.e. the technological variants of the Ziegler polymerization of olefins — are well known from the literature and from practical experience, so that further details are superfluous. The only point still worth noting is that the new titanium-containing catalyst component (1) can — like corresponding conventional catalyst components — be brought together with the catalyst component (2) either outside or inside the polymerization vessel, in the latter case, for example, by spatially separate introduction of the components, which may be handled in the form of a suspension (catalyst component (1) or of a solution (catalyst component (2)). It is also possible, for example, to employ the catalyst component (1) or the combined catalyst components (1) and (2) in the form of particles provided with a wax coating; this method is at times of advantage in dry-phase polymerization processes.

The following points should be noted with regard to the new titanium-containing catalyst component (1):

It is manufactured in two stages which are referred to both in the preceding and the following text by (1.1) and (1.2).

(1.1) In this first stage, a finely divided inorganic oxidic material (I) of the type defined above and a dissolved aluminum compound (II) of the type defined above are brought into contact with one another, resulting in the formation of a solid-phase product (III).

Specifically, the procedure which may be followed advantageously is first to prepare, in separate batches, a suspension of from 1 to 50 percent strength by weight, preferably of about 20 percent strength by weight, of the inorganic oxidic material (I) and a solution of from 5 to 80 percent strength by weight, preferably of about 30 percent strength by weight, of the aluminum compound (II), suitable suspending agents or solvents being, in particular, hydrocarbons, above all relatively low-boiling alkane hydrocarbons, e.g. hexanes, heptanes or gasolines. The suspension and the solution are then combined in relative amounts which give the desired weight ratio. In general, they are combined by introducing the solution into the suspension, whilst stirring, since this method is more practical than the converse, though the latter is also feasible. At temperatures of from $-10°$ to 140° C, especially at about 20° C, the formation of the solid-phase product (III) is complete after from 5 to 300 minutes, especially after from 15 to 120 minutes. The solid-phase product may advantageously be purified before being processed further. Two methods which may be used, inter alia, are to separate the product (III) from the liquid phase by filtration and to wash it with pure liquid (for example of the type which has also been used as the suspending agent or solvent), after which the product is dried, for example under reduced pressure, or the product is digested and subsequently decanted repeatedly, in which case the liquid used may be, for example, the alcohol (IVa) employed as the solvent in the second state (1.2). We have found that in a number of cases it also suffices simply to isolate the product (III) by driving off the volatiles from stage (1.1), i.e. the suspending agent or solvent, under reduced pressure at from 0° to 100° C.

(1.2) In this second stage, the solid-phase product (III) obtained according to (1.1) and a particular solution (IV) defined above are brought into contact, forming a dispersion (V), which is then evaporated to a dry consistency.

Specifically, the procedure which may be followed is to combine the product (III), undiluted or dispersed in an alcohol (advantageously an alcohol is defined under (IVa), the dispersion having a solids content of not less than 5 percent by weight) with the solution (IV). It is advantageous to keep the batch, after combining the constituents, at from 10° to 160° C, especially from 20° to 120° C, for from 5 to 120 minutes, especially from 20 to 90 minutes, and only then to evaporate the dispersion (V) which has been formed.

The solution (IV) can itself be prepared by conventional methods and to this extent exhibits no special features. An advantageous technique has proved to be the preparation of the solution (IV) by combining a solution containing the alcohol (IVa) and the titanium trihalide (IVb) with a solution containing the alcohol (IVa) and the magnesium compound (IVc).

The final measure in manufacturing the titanium-containing catalyst component (1) is to evaporate the dispersion (V) to a dry consistency; the resulting dry solid-phase product (VI) being the new catalyst component (1) according to the invention.

Specifically, the procedure adopted can be one of the conventional methods of evaporating dispersions under gentle conditions, providing the temperatures specified above are observed. This means that it is generally advantageous — and in the case of relatively high alcohols (IVa) at times essential— to carry out the evaporation under reduced pressure, the value of which depends on the case in question. As a rule of thumb, the temperature/pressure combination should be selected so that the evaporation process is complete after from about 1 to 10 hours. It is also advantageous to carry out the evaporation under conditions which ensure that the material undergoing treatment remains homogeneous throughout; for example, rotary evaporators have proved suitable for this purpose. Any residual alcohol, for example alcohol bonded by complex formation, is generally not detrimental to the solid-phase product (VI).

The new titanium-containing catalyst components (1) i.e. the solid-phase products (VI) can be employed, within the scope of the process defined at the outset, for the manufacture of the polymers referred to, by the conventional methods employing titanium-containing compounds in the Ziegler polymerization of olefins. To this extent, the process according to the invention thus exhibits no special features and reference may be made to the methods of using such catalysts which are well-known from the literature and from practical experience. It merely remains to record that the process is exceptionally suitable for the manufacture of homopolymers of ethylene, and that where copolymers of ethylene with higher α-monoolefins, or homopolymers of higher α-monoolefins are manufactured, such α-monoolefins are, above all, propene, 1-butene, 4-methyl-1-pentene and 1-hexene. The molecular weights of the polymers may be regulated in the relevant conventional manner, especially by means of hydrogen as the regulator.

As regards the composition of the new titanium-containing catalyst components (1), the following details should also be noted: (1.1) The inorganic oxidic material (I) to be employed is in general an aluminosilicate or, in particular, a silicon dioxide; it is important that the material should have the requisite properties and should be very dry (no further weight loss after 6 hours at 160° C under 2 mm Hg). Particularly suitable inorganic oxidic materials are those obtained in accordance with stage (1) of the process described in German Laid-Open Application DOS No. 24 11 735, especially if hydrogels obtained by the process described in German Laid-Open Application DOS No. 21 03 243 are used as starting materials.

Examples of suitable aluminum compounds (II) to be employed are aluminum trialkyls, aluminum dialkyl hydrides, aluminum dialkyl chlorides, aluminum alkyl dichlorides, aluminum trichlorides, aluminum trialkoxides, aluminum dialkoxide-chlorides, aluminum alkoxide-dichlorides, alkyl-aluminum dialkoxides and dialkylaluminum alkoxides. Aluminum compounds to be singled out as being particularly suitable are those of the formulae $Al(i-C_4H_9)_2H$, $Al(C_2H_5)_2Cl$, $Al(C_2H_5)_{1.5}Cl_{1.5}$, $Al(C_2H_5)Cl_2$, $Al(OC_2H_5)_3$, $Al(O-i-C_3H_7)_3$, $Al(OC_2H_5)_2C_2H_5$ and $Al(OC_2H_5)(C_2H_5)_2$.

The aluminum compounds (II) may be employed in the form of individual compounds, mixtures of two or more of these or sesquicompounds.

(1.2) The alcohols (IVa) to be employed may be, for example, methanol, ethanol, the propanols and the butanols. Examples of alcohols which have proved particularly suitable are methanol, ethanol, isopropanol and n-butanol.

The alcohols (IVa) may be employed in the form of individual compounds or of mixtures of two or more of these.

The titanium trihalide (IVb) to be employed in stage (1.2) may be a trihalide conventionally used in Ziegler catalyst systems, e.g. a reaction product obtained by reducing a titanium tetrahalide by means of hydrogen, aluminum or aluminum-organic compounds.

Examples of particularly suitable compounds have proved to be trichlorides of the formula $TiCl_3$, as obtained by reduction of titanium tetrachloride by means of hydrogen, and trichlorides of the formula $TiCl_3.\frac{1}{3}AlCl_3$, such as are obtained by reduction of titanium tetrachloride by means of metallic aluminum.

The titanium trihalides may be employed in the form of individual compounds or of mixtures of two or more of these.

The magnesium compound (IVc) to be employed in stage (1.2) may advantageously be a compound from the following categories:

(A) Magnesium compounds of the general formula $Mg(OR')_2$, where R' is a hydrocarbon radical of 1 to 10 carbon atoms, especially alkyl of 1 to 6 carbon atoms.

Examples of particularly suitable compounds are magnesium methylate, ethylate, n-propylate, i-propylate, cyclohexylate and phenolate.

Magnesium ethylate and magnesium n-propylate are especially suitable.

(B) Complex alkoxides of magnesium with other metals, especially with lithium, boron, aluminum and titanium.

Examples of very suitable compounds are the complex alkoxides of the formulae $Mg[Al(OC_2H_5)_4]_2$, $Mg_3[Al(OC_2H_5)_6]_2$, $Li_2[Mg(OC_3H_7)_4]$, $Mg[Ti(OC_3H_7)_6]$ and $Mg[B(OC_2H_5)_4]_2$.

(C) Magnesium halides of the general formula $MgZ_2$, where Z is chlorine, bromine or iodine, especially chlorine or bromine.

Examples of very suitable compounds are magnesium chloride and magnesium bromide.

(D) Complexes of the magnesium halides, mentioned under (C), with alcohols of 1 to 6 carbon atoms, especially with alkanols of 1 to 6 carbon atoms.

Amongst these, the complexes of the formulae $MgCl_2 \cdot 6C_2H_5OH$ and $MgCl_2 \cdot 4CH_3OH$ are particularly suitable.

(E) Magnesium halide compounds of the general formula $MgZ(OR')$, where Z is as defined under (C) and R' as defined under (A).

A particularly suitable compound amongst these has the formula $MgCl(OC_2H_5)$.

(F) The carriers, containing chemically bonded magnesium, which characterize the subject of German Laid-Open Application DOS No 21 63 851, especially manasseite (of the formula $Mg_6 \cdot Al_2(OH)_{16} \cdot CO_3 \cdot 4H_2O$), which has been brought to a chlorine content of from 50 to 75 percent by weight chlorination with phosgene.

The magnesium compounds (IVc) may be employed in the form of individual compounds or of mixtures of two ore more of these; they may of course also be compounds formed in situ when preparing the solution (IV).

Magnesium compounds to be preferred within the scope of the present invention are those of categories A, C, D and F.

The relevant conventional compounds may be used as catalyst component (2); examples of suitable compounds are $Al(C_2H_5)_3$, $Al(C_2H_5)_2Cl$, $Al(C_2H_5)_2H$, $Al(i-C_4H_9)_3$, $Al(n-C_4H_9)_3$, $Al(C_8H_{17})_3$ and isoprenylaluminum.

In conclusion it should be noted that the titanium-containing catalyst components (1) of the invention, i.e. the products (VI), and their precursors and intermediates which have been mentioned, are sensitive to hydrolysis and to oxidation. To this extent, the relevant conventional precautionary measures for Ziegler catalysts (e.g. exclusion of moisture, and working under an inert gas atmosphere) should be taken when handling these substances.

EXAMPLE 1

Manufacture of the titanium-containing catalyst component (1):

(1.1) First Stage of Manufacture

The starting materials are a suspension of 20 parts by weight of silicon dioxide ($SiO_2$, particle diameter 2–40 μm, pore volume 1.6 cm$^3$/g, surface area 300 m$^2$/g) in 140 parts by weight of n-heptane and a solution of 6.2 parts by weight of diethylaluminum chloride in 10 parts by weight of n-heptane.

The above solution is run into the above suspension at −5° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 140 parts by weight of methanol whilst stirring and cooling to −10° C.

This suspension is combined with a solution of 3.25 parts by weight of $TiCl_3.\frac{1}{3} AlCl_3$ and 5 parts by weight of manasseite $(Mg_6.Al_2.(OH)_{16}.CO_3.4H_2O)$, which has been brought to a chlorine content of 72 percent by weight by chlorination with phosgene, in 140 parts by weight of methanol. The resulting suspension is stirred for 30 minutes at 60° C and the resulting solid-phase reaction product is then isolated by driving off the volatiles on a rotary evaporator which is taken to an operating pressure of 20 mm Hg and an operating temperature of 80° C. Analysis of the resulting product, i.e. of the titanium-containing catalyst component (1), shows a titanium content of 1.95 percent by weight and a chlorine content of 16.6 percent by weight. Polymerization:

0.027 Part by weight of the titanium-containing catalyst component (1) is suspended in 10 parts by weight of heptane and 0.3 part by weight of $Al(i-C_4H_9)_3$ (2) is added (these amounts correspond to an atomic ratio of titanium from catalyst component (1) to metal (Me = aluminum) from catalyst component (2) of about 1 : 150).

The Ziegler catalyst system thus obtained is introduced into a stirred autoclave which is charged with 80 parts by weight (corresponding to about 20% of its capacity) of finely divided polyethylene. The polymerization is then carried out, whilst stirring, for a period of 2 hours, with the following parameters, which are each regulated to maintain constant values: ethylene pressure = 27.5 bars, hydrogen pressure = 5 bars, temperature = 100° C. The polymerization is then discontinued by letting down the autoclave.

Details of the product are to be found in the Table which follows.

EXAMPLE 2

The titanium-containing catalyst component (1) is manufactured as in Example 1.

Polymerization 0.42 Part by weight of the titanium-containing catalyst component (1) is suspended in 20 parts by weight of heptane and 3 parts by weight of $Al(C_2H_5)_3$(2) are added (these amounts correspond to an atomic ratio of titanium from catalyst component (1) to metal (Me = aluminum) from catalyst component (2) of about 1 : 154).

The Ziegler catalyst system thus obtained is introduced into a stirred autoclave which is charged with 10 liters (corresponding to about 40% of its capacity) of isobutane. The polymerization is then carried out, whilst stirring, for a period of 2 hours, with the following parameters, which are each regulated to maintain constant values: ethylene pressure = 15 bars, hydrogen pressure = 5 bars, temperature = 100° C. The polymerization is then discontinued by letting down the autoclave.

Details of the product are to be found in the Table which follows.

EXAMPLE 3

Manufacture of the Titanium-containing Catalyst Component (1)

(1.1) First Stage of Manufacture

The starting materials are a suspension of 1,000 parts by weight of silicon dioxide ($SiO_2$, particle diameter 20–180 μm, pore volume 1.6 cm$^3$/g, surface area 300 m$^2$/g) in 4,000 parts by weight of n-heptane and a solution of 290 parts by weight of diethylaluminum chloride in 140 parts by weight of n-heptane.

The above solution is run into the above suspension at 20° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 4,000 parts by weight of methanol whilst stirring and cooling to −10° C.

This suspension is combined with a solution of 163 parts by weight of $TiCl_3.\frac{1}{3} AlCl_3$ and 250 parts by weight of manasseite $(Mg_6. Al_2. (OH)_{16}.CO_3.4H_2O)$, which has been brought to a chlorine content of 72 percent of weight by chlorination with phosgene, in 3,400 parts by weight of methanol. The resulting suspension is stirred for 40 minutes at 60° C and the resulting solid-phase reaction product is then isolated by driving off the volatiles on a rotary evaporator which is taken to an operating pressure of 100 mm Hg and an operating temperature of 80° C. Analysis of the resulting product, i.e. of the titanium-containing catalyst component (1), shows a titanium content of 1.88 percent by weight and a chlorine content of 14.3 percent by weight.

Polymerization:

0.39 Part by weight of the titanium-containing catalyst component (1) is suspended in 20 parts by weight of heptane and 1.7 parts by weight of $Al(C_2H_5)_3$ (2) are added (these amounts correspond to an atomic ratio of titanium from catalyst component (1) to metal (Me = aluminum) from catalyst component (2) of about 1 : 99).

The Ziegler catalyst system thus obtained is introduced into a stirred autoclave which is charged with 5 liters (corresponding to about 50% of its capacity) of isobutane. The polymerization is then carried out, whilst stirring, for a period of 2 hours, with the following parameters, which are each regulated to maintain constant values: ethylene pressure = 15 bars, hydrogen pressure = 5 bars, temperature = 100° C. The polymerization is then discontinued by letting down the autoclave.

Details of the product are to be found in the Table which follows.

EXAMPLE 4

Manufacture of the Titanium-containing Catalyst Component (1)

(1.1) First Stage of Manufacture

The starting materials are a suspension of 20 parts by weight of silicon dioxide ($SiO_2$, particle diameter 2–40 μm, pore volume 2.0 cm$^3$/g, surface area 330 m$^2$/g) in 170 parts by weight of n-heptane and a solution of 9.0 parts by weight diethylaluminum chloride in 10 parts by weight of n-heptane.

The above solution is run into the above suspension at −10° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 170 parts by weight of methanol whilst stirring and cooling to −20° C.

This suspension is combined with a solution of 2.17 parts by weight of $TiCl_3$ and 5 parts by weight of manasseite ($Mg_6.Al_2.(OH)_{16}.CO_3.4H_2O$), which has been brought to a chlorine content of 72 percent by weight by chlorination with phosgene, in 140 parts by weight of methanol. The resulting suspension is stirred for 15 minutes at 60° C and the resulting solid-phase reaction product is then isolated by driving off the volatiles on a rotary evaporator which is taken to an operating pressure of 15 mm Hg and an operating temperature of 80° C. Analysis of the resulting product, i.e. of the titanium-containing catalyst component (1), shows a titanium content of 2.1 percent by weight and a chlorine content of 14.0 percent by weight.

Polymerization 0.026 Part by weight of the titanium-containing catalyst component (1) is suspended in 10 parts by weight of heptane and 0.3 part by weight of $Al(i-C_4H_9)_3$ (2) is added (these amounts correspond to an atomic ratio of titanium from catalyst component (1) to metal (Me = aluminum) from catalyst component (2) of about 1 : 152).

The Ziegler catalyst system thus obtained is introduced into a stirred autoclave which is charged with 80 parts by weight (corresponding to about 20% of its capacity) of finely divided polyethylene. The polymerization is then carried out, whilst stirring, for a period of 2 hours, with the following parameters, which are each regulated to maintain constant values: ethylene pressure = 27.5 bars, hydrogen pressure = 5 bars, temperature = 100° C. The polymerization is then discontinued by letting down the autoclave.

Details of the product are to be found in the Table which follows.

EXAMPLE 5

Manufacture of the Titanium-Containing Catalyst Component (1)

(1.1) First Stage of Manufacture

The starting materials are a suspension of 20 parts by weight of silicon dioxide ($SiO_2$, particle diameter 2–40μm, pore volume 2.1 cm$^3$/g, surface area 330 m$^2$/g) in 170 parts by weight of n-heptane and a solution of 9 parts by weight of diethylaluminum chloride in 10 parts by weight of n-heptane.

The above solution is run into the above suspension at −5° C, whilst stirring, in the course of 30 minutes, after which the batch is kept at 25° C for a further 40 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 170 parts by weight of methanol whilst stirring and cooling to −10° C.

This suspension is combined with a solution of 3.25 parts by weight of $TiCl_3.\frac{1}{3} AlCl_3$ and 5 parts by weight of manasseite ($Mg_6.Al_2.(OH)_{16}.CO_3.4H_2O$), which has been brought to a chlorine content of 72 percent by weight by chlorination with phosgene, in 140 parts by weight of methanol. The resulting suspension is stirred for 30 minutes at 40° C and the resulting solid-phase reaction product is then isolated by driving off the volatiles on a rotary evaporator which is taken to an operating pressure of 20 mm Hg and an operating temperature of 80° C. Analysis of the resulting product, i.e. of the titanium-containing catalyst component (1), shows a titanium content of 1.96 percent by weight and a chlorine content of 17.0 percent by weight.

Polymerization 0.02 Part by weight of the titanium-containing catalyst component (1) is suspended in 10 parts by weight of heptane and 0.08 part by weight of $Al(C_2H_5)_3$ (2) is added (these amounts correspond to an atomic ratio of titanium from catalyst component (1) to metal (Me = aluminum) from catalyst component (2) of about 1 : 86).

The Ziegler catalyst system thus obtained is introduced into a stirred autoclave which is charged with 80 parts by weight (corresponding to about 20% of its capacity) of finely divided polyethylene. The polymerization is then carried out, whilst stirring, for a period of 2 hours, with the following parameters, which are each regulated to maintain constant values: ethylene pressure = 27.5 bars, hydrogen pressure = 5 bars, temperature = 100° C. The polymerization is then discontinued by letting down the autoclave.

Details of the product are to be found in the Table which follows.

EXAMPLE 6

Manufacture of the Titanium-Containing Catalyst Component (1)

(1.1) First Stage of Manufacture

The starting materials are a suspension of 10 parts by weight of silicon dioxide ($SiO_2$, particle diameter 40–148μm, pore volume 1.6 $cm^3/g$, surface area 300 $m^3/g$) in 140 parts by weight of n-heptane and a solution of 3 parts by weight of diethylaluminum chloride in 10 parts by weight of n-heptane.

The above solution is run into the above suspension at −8° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 120 parts by weight of ethanol whilst stirring and cooling at −5° C.

This suspension is combined with a solution of 1.63 parts by weight of $TiCl_3.\frac{1}{3} AlCl_3$ and 2.5 parts by weight of manasseite ($Mg_6.Al_2.(OH)_{16}.CO_3.4H_2O$), which has been brought to a chlorine content of 70 percent by weight by chlorination with phosgene, in 120 parts by weight of ethanol. The resulting suspension is stirred for 20 minutes at 80° C and the resulting solid-phase reaction product is then isolated by driving off the volatiles on a rotary evaporator which is taken to an operating pressure of 20 mm Hg and an operating temperature of 80° C. Analysis of the resulting product, i.e. of the titanium-containing catalyst component (1), shows a titanium content of 2.0 percent by weight and a chlorine content of 15.7 percent by weight.

Polymerization 0.04 Part by weight of the titanium-containing catalyst component (1) is suspended in 10 parts by weight of heptane and 0.3 part by weight of $Al(i-C_4H_9)_3$ (2) is added (these amounts correspond to an atomic ratio of titanium from catalyst component (1) to metal (Me = aluminum) from catalyst component (2) of about 1 : 89).

The Ziegler catalyst system thus obtained is introduced into a stirred autoclave which is charged with 80 parts by weight (corresponding to about 20% of its capacity) of finely divided polyethylene. The polymerization is then carried out, whilst stirring, for a period of 2 hours, with the following parameters, which are each regulated to maintain constant values: ethylene pressure = 27.5 bars, hydrogen pressure = 5 bars, temperature = 100° C. The polymerization is then discontinued by letting down the autoclave.

Details of the product are to be found in the Table which follows.

EXAMPLE 7

Manufacture of the Titanium-Containing Catalyst Component (1)

(1.1) First Stage of Manufacture

The starting materials are a suspension of 10 parts by weight of silicon dioxide ($SiO_2$, particle diameter 40–148μm, pore volume 1.6 $cm^3/g$, surface area 300 $m^2/g$) in 140 parts by weight of n-heptane and a solution of 3 parts by weight of diethylaluminum chloride in 10 parts by weight of n-heptane.

The above solution is run into the above suspension at −10° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 140 parts by weight of n-butanol whilst stirring and cooling to −10° C.

This suspension is combined with a solution of 1.63 parts by weight of $TiCl_3.\frac{1}{3} AlCl_3$ and 2.5 parts by weight of $MgCl_2$ in 200 parts by weight of methanol. The resulting suspension is stirred for 30 minutes at 80° C and the resulting solid-phase reaction product is then isolated by driving off the volatiles on a rotary evaporator which is taken to an operating pressure of 20 mm Hg and an operating temperature of 80° C. Analysis of the resulting product, i.e. of the titanium-containing catalyst component (1), shows a titanium content of 2.0 percent by weight and a chlorine content of 13.2 percent by weight.

Polymerization 0.04 Part by weight of the titanium-containing catalyst component (1) is suspended in 10 parts by weight of heptane and 0.3 part by weight of $Al(i-C_4H_9)_3$ (2) is added (these amounts correspond to an atomic ratio of titanium from catalyst component (1) to metal (Me = aluminum) from catalyst component (2) of about 1 : 89).

The Ziegler catalyst system thus obtained is introduced into a stirred autoclave which is charged with 80 parts by weight (corresponding to about 20% of its capacity) of finely divided polyethylene. The polymerization is then carried out, whilst stirring, for a period of 2 hours, with the following parameters, which are each regulated to maintain constant values: ethylene pressure = 27.5 bars, hydrogen pressure = 5 bars, temperature = 100° C. The polymerization is then discontinued by letting down the autoclave.

Details of the product are to be found in the Table which follows.

EXAMPLE 8

Manufacture of the Titanium-Containing Catalyst Component (1)

(1.1) First Stage of Manufacture

The starting materials are a suspension of 10 parts by weight of silicon dioxide ($SiO_2$, particle diameter 20–180 μm, pore volume 1.6 $cm^3/g$, surface area 300 $m^2/g$) in 80 parts by weight of n-heptane and a solution of 3 parts by weight of diethylaluminum chloride in 5 parts by weight of n-heptane.

The above solution is run into the above suspension at 20° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 80 parts by weight of methanol whilst stirring and cooling to −20° C.

This suspension is combined with a solution of 1.62 parts by weight of $TiCl_3.\frac{1}{3} AlCl_3$ and 2.5 parts by weight of manasseite $(Mg_6.Al_2.(OH)_{16}.CO_3.4H_2O)$, which has been brought to a chlorine content of 72 percent by weight by chlorination with phosgene, in 70 parts by weight of methanol. The resulting suspension is stirred for 30 minutes at 20° C and the resulting solid-phase reaction product is then isolated by driving off the volatiles on a rotary evaporator which is taken to an operating pressure of 20 mm Hg and an operating temperature of 20° C. Analysis of the resulting product, i.e. of the titanium-containing catalyst component (1), shows a titanium content of 1.50 percent by weight and a chlorine content of 14.5 percent by weight.

Polymerization 0.48 Part by weight of the titanium-containing catalyst component (1) is suspended in 20 parts by weight of heptane and 2.4 parts by weight of $Al(C_2H_5)_3$ (2) are added (these amounts correspond to an atomic ratio of titanium from catalyst component (1) to metal (Me = aluminum) from catalyst component (2) of about 1 : 140).

The Ziegler catalyst system thus obtained is introduced into a stirred autoclave which is charged with 5 liters (corresponding to about 50% of its capacity) of isobutane. The polymerization is then carried out, whilst stirring, for a period of 2 hours, with the following parameters, which are each regulated to maintain constant values: ethylene pressure = 15 bars, hydrogen pressure = 5 bars, temperature = 100° C. The polymerization is then discontinued by letting down the autoclave.

Details of the product are to be found in the Table which follows.

EXAMPLE 9

Manufacture of the Titanium-Containing Catalyst Component (1)

(1.1) First Stage of Manufacture

The starting materials are a suspension of 20 parts by weight of silicon dioxide ($SiO_2$, particle diameter 2–40 μm, pore volume 1.6 cm$^3$/g, surface area 300 m$^2$/g) in 140 parts by weight of n-heptane and a solution of 7 parts by weight of ethylaluminum dichloride in 10 parts by weight of n-heptane.

The above solution is run into the above suspension at −5° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 140 parts by weight of methanol whilst stirring and cooling to −10° C.

This suspension is combined with a solution of 3.25 parts by weight of $TiCl_3.\frac{1}{3} AlCl_3$ and 5 parts by weight of manasseite $(Mg_6.Al_2.(OH)_{16}.CO_3.4H_2O)$, which has been brought to a chlorine content of 72 percent by weight by chlorination with phosgene, in 140 parts by weight of methanol. The resulting suspension is stirred for 30 minutes at 60° C and the resulting solid-phase reaction product is then isolated by driving off the volatiles on a rotary evaporator which is taken to an operating pressure of 20 mm Hg and an operating temperature of 80° C. Analysis of the resulting product, i.e. of the titanium-containing catalyst component (1), shows a titanium content of 1.8 percent by weight and a chlorine content of 15.7 percent by weight.

Polymerization 0.045 Part by weight of the titanium-containing catalyst component (1) is suspended in 10 parts by weight of heptane and 0.3 part by weight of $Al(i-C_4H_9)_3$ (2) is added (these amounts correspond to an atomic ratio of titanium from catalyst component (1) to metal (Me = aluminum) from catalyst component (2) of about 1 : 90).

The Ziegler catalyst system thus obtained is introduced into a stirred autoclave which is charged with 80 parts by weight (corresponding to about 20% of its capacity) of finely divided polyethylene. The polymerization is then carried out, whilst stirring, for a period of 2 hours, with the following parameters, which are each regulated to maintain constant values: ethylene pressure = 27.5 bars, hydrogen pressure = 5 bars, temperature = 100° C. The polymerization is then discontinued by letting down the autoclave.

Details of the product are to be found in the Table which follows.

EXAMPLE 10

Manufacture of the Titanium-Containing Catalyst Component (1)

(1.1) First Stage of Manufacture

The starting materials are a suspension of 20 parts by weight of silicon dioxide ($SiO_2$, particle diameter 40–148 μm, pore volume 1.6 cm$^3$/g, surface area 300 m$^2$/g) in 140 parts by weight of n-heptane and a solution of 6.2 parts by weight of diethylaluminum chloride in 10 parts by weight of n-heptane.

The above solution is run into the above suspension at −5° C, whilst stirring, in the course of 30 minutes, after which the batch is kept at 25° C for a further 60 minutes, whilst stirring.

The solid-phase product is isolated from the resulting suspension by filtering off, washing with n-heptane and drying under reduced pressure; it is employed in the second stage (1.2).

(1.2) Second Stage of Manufacture

The solid-phase product obtained in stage (1.1) is suspended in 140 parts by weight of methanol whilst stirring and cooling to −10° C.

This suspension is combined with a solution of 3.25 parts by weight of $TiCl_3.\frac{1}{3} AlCl_3$ and 2.41 parts by weight of $Mg(OC_2H_5)_2$ in 220 parts by weight of methanol. The resulting suspension is stirred for 30 minutes at 60° C and the resulting solid-phase reaction product is then isolated by driving off the volatiles on a rotary evaporator which is taken to an operating pressure of 20 mm Hg and an operating temperature of 80° C. Analysis of the resulting product, i.e. of the titanium-containing catalyst component (1), shows a titanium content of 2.2 percent by weight and a chlorine content of 10.1 percent by weight.

Polymerization 0.038 part by weight of the titanium-containing catalyst component (1) is suspended in 10 parts by weight of heptane and 0.08 part by weight of Al(C$_2$H$_5$)$_3$ (2) is added (these amounts correspond to an atomic ratio of titanium from catalyst component (1) to metal (Me = aluminum) from catalyst component (2) of about 1 : 40).

The Ziegler catalyst system thus obtained is introduced into a stirred autoclave which is charged with 80 parts by weight (corresponding to about 20% of its capacity) of finely divided polyethylene. The polymerization is then carried out, whilst stirring, for a period of 2 hours, with the following parameters, which are each regulated to maintain constant values: ethylene pressure = 27.5 bars, hydrogen pressure = 5 bars, temperature = 100° C. The polymerization is then discontinued by letting down the autoclave.

Details of the product are to be found in the table which follows:

| Example | Yield of polyethylene parts by weight | Grams of polyethylene per gram of catalyst component (1) | Grams of polyethylene per gram of titanium | Tap density g/l | FT*) sec | Melt Index MI$_{2.16}$ g/10 min | Residual amount of chlorine in the polymer ppm**) |
|---|---|---|---|---|---|---|---|
| 1 | 280 | 10,370 | 532,000 | 450 | 7.0 | 1.45 | 16 |
| 2 | 3,950 | 9,400 | 482,000 | 420 | 6.9 | 3.1 | 18 |
| 3 | 2,200 | 5,640 | 300,000 | 380 | 7.5 | 10.0 | 25 |
| 4 | 330 | 12,700 | 604,000 | 410 | 7.2 | 1.1 | 11 |
| 5 | 315 | 15,700 | 800,000 | 425 | 7.6 | 0.4 | 11 |
| 6 | 290 | 7,250 | 360,000 | 400 | 7.0 | 1.3 | 22 |
| 7 | 210 | 5,250 | 263,000 | 420 | 7.6 | 1.5 | 25 |
| 8 | 2,300 | 4,790 | 320,000 | 335 | 7.8 | 8.9 | 30 |
| 9 | 350 | 7,800 | 430,000 | 480 | 7.4 | 1.2 | 20 |
| 10 | 160 | 4,200 | 191,000 | 410 | 7.0 | 0.9 | 24 |

*)FT = flow test, carried out in accordance with ASTM D 1895-67, method A
**)Calculated from the productivity and from the chlorine content of the catalyst

We claim:

1. A process for the manufacture of homopolymers and copolymers of α-monoolefins of 2 to 6 carbon atoms by polymerizing the monomer or monomers at from 30° to 200° C and pressures of from 0.1 to 200 bars, using a Ziegler catalyst system comprising
   (1) a titanium-containing catalyst component and
   (2) a metal compound of the general formula $$Me\ A_{m-n}X_n$$

where Me is aluminum, magnesium or zinc, A is a hydrocarbon radical of 1 to 12 carbon atoms, X is chlorine, bromine, iodine or hydrogen, $m$ is the valency of the metal Me and $n$ is a number from 0 to $m-1$, with the proviso that the atomic ratio of titanium from catalyst component (1) to metal (Me) from catalyst component (2) is from 1 : 0.1 to 1 : 500, wherein the titanium-containing catalyst component (1) employed is the solid-phase product (VI) obtained by first (1.1) bringing into contact
(1.1.1) a finely divided, porous, inorganic oxidic material (I) which has a particle diameter of from 1 to 1,000 μm, a pore volume of from 0.3 to 3 cm$^3$/g and a surface area of from 100 to 1,000 m$^2$/g and which has the formula SiO$_2$.aAl$_2$O$_3$, where $a$ is a numbe from 0 to 2 and
(1.1.2) an aluminum compound (II), dissolved in an organic solvent, the compound having the general formula $$Al\ B_{3-p}Y_p$$

where B is a hydrocarbon radical of 1 to 12 carbon atoms, Y is chlorine, bromine, iodine, hydrogen or OR, R is a hydrocarbon radical of 1 to 12 carbon atoms and $p$ is a number from 0 to 3 to form a solid-phase product (III), with the proviso that the weight ratio of inorganic oxidic material (I) employed to aluminum compound (II) employed is from 1 : 0.05 to 1 : 10, and then (1.2) bringing into contact
(1.2.1) the solid-phase product (III) obtained from stage (1.1) and
(1.2.2) a solution (IV) obtained by bringing together (IVa) 100 parts by weight of an alcohol of the general formula $$Z-OH$$

where Z is a saturated hydrocarbon radical of 1 to 8 carbon atoms, (IVb) from 0.01 to 6 parts by weight (calculated as titanium) of a titanium trihalide, where the halogen may be chlorine and/or bromine and (IVc) from 0.01 to 4 parts by weight (calculated as magnesium) of a magnesium compound which is soluble in the alcohol (IVa) to form a dispersion (V), with the proviso that the weight ratio of solid-phase product (III — calculated as inorganic oxidic material I) — to titanium in the titanium trihalide (IVb) is from 1 : 0.01 to 1 : 0.2 and the weight ratio of solid-phase product (III — calculated as inorganic oxidic material I) — to magnesium in the magnesium compound (IVc) is from 1 : 0.01 to 1 : 0.25, and evaporating the dispersion (V) at below 200° C, and above the melting point of the alcohol (IVa) used, the evaporation being substantially complete in about 1 to 10 hours, until it reaches a dry consistency, i.e. until the solid-phase product (VI) is formed, any residual alcohol being left in said solid-phase product (VI).

2. A process as set forth in claim 1, wherein the titanium trihalide is titanium trichloride.

3. A process as set forth in claim 1, wherein the titanium trihalide has the formula TiCl$_3$.⅓ AlCl$_3$.

4. A process as set forth in claim 1, wherein the magnesium compound contains halogen and/or carbon.

5. A process as set forth in claim 1, wherein the magnesium compound has the formula Mg(OR')$_2$ where R' is hydrocarbon radical of 1 to 10 carbon atoms.

6. A process as set forth in claim 1, wherein the magnesium compound is a complex alkoxide of magnesium with lithium, boron, aluminum or titanium.

7. A process as set forth in claim 1, wherein the magnesium compound has the formula $MgZ_2$ where Z is chlorine, bromine or iodine.

8. A process as set forth in claim 7, wherein the magnesium halide is complexed with alcohols of 1 to 6 carbon atoms.

9. A process as set forth in claim 1, wherein the magnesium compound has the formula $MgZ(OR')$ were z is chlorine, bromine or iodine and R' is a hydrocarbon radical of 1 to 10 carbon atoms.

10. A process as set forth in claim 1, wherein the magnesium compound is a manasseite of the formula $Mg_6.Al_2.(OH)_{16}.CO_3.4H_2O$ which has been brought to a chlorine content of from 50 to 75 percent by weight.

11. A process as set forth in claim 1, wherein the dispersion V is evaporated at below 160° C.

12. A process as set forth in claim 1, wherein the dispersion V is kept at from 10° to 160° C for from 5 to 120 minutes prior to evaporation.

13. A process as set forth in claim 1, wherein the evaporation is carried out at reduced pressure.

14. A process as set forth in claim 1, wherein the inorganic oxidic material (I) is very dry and exhibits no weight loss when heated for 6 hours at under 2 mm Hg and 160° C.

15. A process as set forth in claim 1, wherein the aluminum compound comprises at least one of aluminum trialkyls, aluminum dialkyl hydrides, aluminum dialkyl chlorides, aluminum alkyl dichlorides, aluminum trichloride, aluminum trialkoxides, aluminum dialkoxide-chlorides, aluminum alkoxide-dichlorides, alkyl-aluminum dialkoxides and dialkyl-aluminum alkoxides.

16. A process as set forth in claim 1, wherein the aluminum compound is at least one of the compounds having the formulae $Al(i-C_4H_9)_2H$, $Al(C_2H_5)_2Cl$, $Al(C_2H_5)_{1.5}Cl_{1.5}$, $Al(C_2H_5)Cl_2$, $Al(OC_2H_5)_3$, $Al(O-i-C_3H_7)_3$, $Al(OC_2H_5)_2C_2H_5$ and $Al(OC_2H_5)(C_2H_5)_2$.

17. A process as set forth in claim 1, wherein the components (I) and (II) are combined at from −10° to 140° C.

18. A process as set forth in claim 1, wherein the solid-phase reaction product (III) is isolated from the solvent.

* * * * *

UNITED STATES PATENT AND TRADEMARK OFFICE
CERTIFICATE OF CORRECTION

PATENT NO. : 4,113,933
DATED : September 12, 1978
INVENTOR(S) : SCHWEIER ET AL

It is certified that error appears in the above—identified patent and that said Letters Patent are hereby corrected as shown below:

In Claim 1, line 61 of column 15, cancel "numbe" and substitute --number--.

In Claim 9, line 8 of column 17, cancel "were" and substitute --where--.

Signed and Sealed this

Tenth Day of April 1979

[SEAL]

Attest:

RUTH C. MASON
Attesting Officer

DONALD W. BANNER
Commissioner of Patents and Trademarks